United States Patent [19]
Fukuzaki et al.

[11] Patent Number: 5,661,269
[45] Date of Patent: Aug. 26, 1997

[54] POSITION POINTING DEVICE HAVING RESONANT CIRCUIT WITH SEQUENTIALLY CHANGED CHARACTERISTICS AND COMBINATION THEREOF WITH POSITION DETECTING DEVICE

[75] Inventors: Yasuhiro Fukuzaki; Yuji Katsurahira, both of Saitama-ken, Japan

[73] Assignee: Wacom Co., Ltd., Saitama-ken, Japan

[21] Appl. No.: 405,246

[22] Filed: Mar. 17, 1995

Related U.S. Application Data

[63] Continuation-in-part of Ser. No. 377,085, Jan. 26, 1995.

[30] Foreign Application Priority Data

Feb. 3, 1994 [JP] Japan ............... 6-11558

[51] Int. Cl.$^6$ ............... G08C 21/00; G09G 3/02
[52] U.S. Cl. ............... 178/18; 198/19; 345/156; 345/179; 345/176
[58] Field of Search ............... 178/18, 19, 20; 345/156, 157, 158, 176, 177, 179

[56] References Cited

U.S. PATENT DOCUMENTS

| | | | |
|---|---|---|---|
| 4,616,106 | 10/1986 | Fowler | 178/18 |
| 4,617,515 | 10/1986 | Taguchi | 178/19 |
| 4,697,050 | 9/1987 | Farel | 178/18 |
| 4,786,764 | 11/1988 | Padula | 178/19 |
| 4,786,765 | 11/1988 | Yamanami | 178/19 |
| 4,992,630 | 2/1991 | Mietzko | 178/18 |
| 5,349,139 | 9/1994 | Verrier et al. | 178/19 |

FOREIGN PATENT DOCUMENTS

| | | |
|---|---|---|
| 63-70326 | 3/1988 | Japan . |
| 64-53223 | 3/1989 | Japan . |
| 2-155019 | 6/1990 | Japan . |
| 5-233126 | 9/1993 | Japan . |

*Primary Examiner*—Curtis Kuntz
*Assistant Examiner*—Vijay Shankar
*Attorney, Agent, or Firm*—Lowe, Price, LeBlanc & Becker

[57] ABSTRACT

A position pointing device for use with a digitizing tablet sequentially transmits plural different kinds of non-positional information to the tablet. The position pointing device varies a resonance characteristic of a resonance circuit in accordance with plural kinds of amount information, during each of plural sequential time slots. A tablet detects a resonance characteristic of the resonance circuit. The frequency and/or amplitude of the AC field coupled from the resonance circuit to the tablet are varied. The frequency variation is sufficiently small that it can be detected with a synchronous detector driven by a single frequency.

26 Claims, 7 Drawing Sheets

POSITION POINTING DEVICE HAVING RESONANT CIRCUIT WITH SEQUENTIALLY CHANGED CHARACTERISTICS AND COMBINATION THEREOF WITH POSITION DETECTING DEVICE

RELATIONSHIP TO CO-PENDING APPLICATION

The present application is a continuation-in-part application of U.S. application Ser. No. 08/377,085 filed Jan. 26, 1995.

BACKGROUND OF THE INVENTION

1. Field of the Invention:

The present invention relates to improvements in a position detecting device and a position pointing device therefor, which employ electric waves.

2. Description of the Related Art:

Prior to the instant application, the applicant has proposed, in Japanese Patent Application No. 61-213970 (Japanese Patent Laid-Open No. 63-70326), a position detecting device in which a tablet exchanges electric wave signals with a position pointing device so as to determine the coordinate value of a position pointed by the position pointing device.

Briefly, the position detecting device disclosed in Japanese Patent Laid-Open No. 63-70326 has a plurality of loop coils constituting the tablet and is adapted to transmit an electric wave of a predetermined frequency. The electric wave is received by a resonance circuit provided in the position pointing device so that resonance takes place in the resonance circuit to emit electric wave. This electric wave is received by the loop coil so that a voltage is induced in the loop coil. This operation is conducted successively on the plurality of loop coils constituting the tablet, so that the coordinate value of the position pointed by the position pointing device is determined based on the levels of the voltages induced in the loop coils.

The position detecting device of the type described faces a demand for the ability to enter various kinds of information in addition to the coordinate value of a pointed position, such as information which indicates that the position pointing device, e.g., a pen or the like, has been set to a position for pointing a definite position (this state will be referred to as "pen-down state," hereinafter), information concerning the type of the position pointing device, e.g., a pen, a cursor or the like, as well as a demand for inputting, together with the coordinate values, information for continuously varying values of parameters other than the coordinate information, such as, for example, thickness or width of a line and hue or density (brightness) of the position or area appointed by the pointing device.

To cope with such demands, the position pointing device disclosed in Japanese Patent Laid-Open No. 63-70326 employs a manual switch which selectively connects, to the resonance circuit which is constituted by a coil and a capacitor, an additional capacitor so as to slightly vary the resonance frequency according to the operation of the switch, the slight change in the resonance frequency being detected as a variation in the phase angle with respect to the predetermined frequency so as to be used as information indicative of the aforesaid pen-down state or the type of the position pointing device.

In Japanese Patent Application No. 62-208293 (Japanese Patent Laid-Open No. 64-53223), the applicant also proposed a position detecting device having a resonance circuit including a coil the inductance of which continuously varies according to the pen pressure, so that the resonance frequency continuously varies according to the pen pressure, the linear variation in the resonance frequency being detected as a continuous variation in the phase angle with respect to the predetermined frequency so as to be used as information for continuously varying the parameter (hereinafter referred to as "continuous amount information").

The device disclosed in Japanese Patent Laid-Open No. 64-53223 sets the range over which the resonance frequency varies in accordance with the variation in the inductance of the coil so that it coincides with the range (about −60° to about +60°) over which such variation in the resonance frequency can be detected in terms of phase angle in relation to the predetermined frequency. This posed a problem in that only one type of continuous amount information can be entered.

To cope with the problem, the applicant proposed, in Japanese Patent Application No. 63-308712 (Japanese Patent Laid-Open No. 2-155019), a device which permits the input of two types of continuous amount information by setting the range over which the resonance frequency continuously varies in accordance with the pen pressure so that it can be switched between two ranges obtained by nearly bisecting the range over which such variation can be detected in terms of phase angle with respect to the predetermined frequency. The applicant further proposed, in Japanese Patent Application No. 4-36508, a device which is designed to selectively transmit a plurality of electric waves of different frequencies from a tablet and also selectively set the range over which the resonance frequency continuously varies with the pen pressure as a range over which such variation can be detected in terms of the phase angle corresponding to each of the plurality of different frequencies, thereby permitting the input of a plurality of continuous amount information.

The device disclosed in Japanese Patent Laid-Open No. 2-155019, however, was disadvantageous in that the varying range of the information that can be transmitted by a piece of continuous amount information is limited and also in that the phase angle for the same pen pressure completely changes when the range is changed, requiring separate correction values for correcting the continuous amount information with respect to the phase angles. Further, the device disclosed in Japanese Patent Application No. 4-36508 requires that a plurality of electric waves be set at different frequencies which are appropriately apart from each other so that the resonance frequencies do not overlap each other when they vary according to the pen pressure, presenting a disadvantage in that it needs a wider frequency domain.

SUMMARY OF THE INVENTION

Accordingly, an object of the present invention is to provide a position detecting device and a position pointing device therefor, which are capable of transmitting a plurality of continuous amount information without limiting the varying range of transmissive information and without the need of a wider frequency domain.

To this end, according to one aspect of the present invention, there is provided a position detecting device having a position pointing device which includes a resonance circuit, a timing extracting means for extracting predetermined timing information from induced voltage which occurs in the resonance circuit and which includes the predetermined timing information, a plurality of resonance characteristic varying means for continuously varying the resonance characteristic of the resonance circuit in accordance with a plurality of kinds of continuous amount information, and a selective connecting means for connecting in sequence the plurality of resonance characteristic varying means to the resonance circuit at a plurality of particular timings based on the predetermined timing information; and a tablet which includes an electric wave generating means for generating an electric wave for driving the resonance circuit of the position pointing device, a timing control means for controlling the electric wave so that it includes the predetermined timing information, an electric wave detecting means for detecting an electric wave emitted by the resonance circuit of the position pointing device, a coordinate detecting means for determining the coordinate value of a position pointed by the position pointing device from the detected electric wave, a resonance characteristic detecting means for detecting the resonance characteristic of the resonance circuit of the position pointing device from the electric waves detected at a plurality of particular timings based on the predetermined timing information, and an information reproducing means for reproducing a plurality of kinds of continuous amount information from the detected resonance characteristic.

The above and other objects, features, and advantages of the present invention will become clear from the following description when the same is read in conjunction with the accompanying drawings.

DESCRIPTION OF THE PREFERRED EMBODIMENTS

Before turning to the description of preferred embodiments, a description will be given of a basic form of the present invention.

Figure 1:
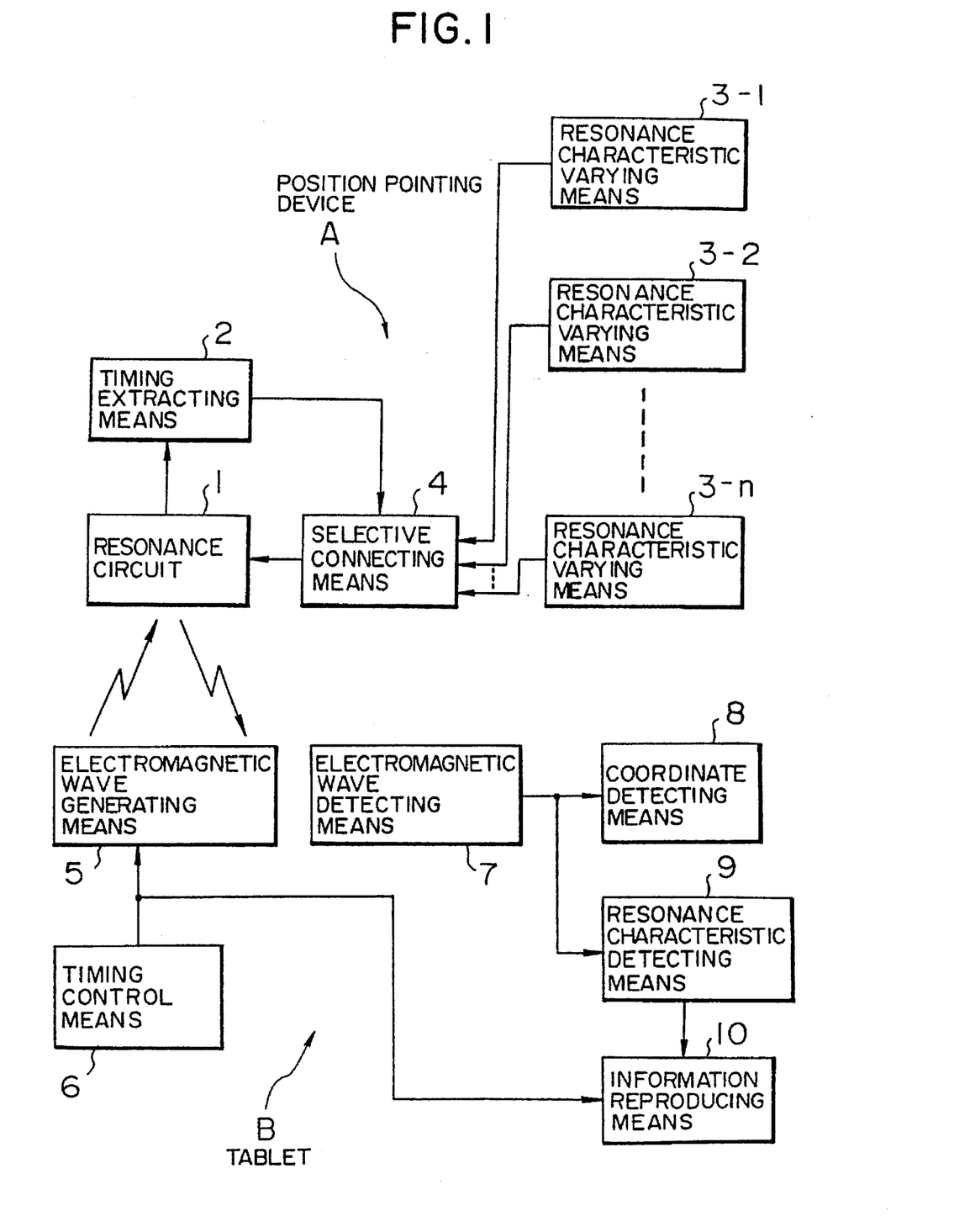
FIG. 1 is a block diagram illustrative of a basic form of the position detecting device and the position pointing device therefor in accordance with the present invention.

FIG. 1 is the block diagram showing the basic form of the position detecting device and the position pointing device therefor in accordance with the present invention. Position pointing device A in accordance with this basic form of the invention includes a resonance circuit 1, a timing extracting means 2 for extracting predetermined timing information from an induced voltage, which occurs in the resonance circuit 1 and which contains the predetermined timing information, a plurality of resonance characteristic varying means 3-1, 3-2, . . . 3-n for continuously varying the resonance characteristic of the resonance circuit 1 in accordance with a plurality of kinds of continuous amount information, and a selective connecting means 4 for connecting in sequence the plurality of resonance characteristic varying means 3-1 through 3-n to the resonance circuit 1 at a plurality of particular timings based on the aforesaid predetermined timing information.

Tablet B in the Figure includes an electric wave generating means 5 for generating an electric wave for driving the resonance circuit 1 of position pointing device A, a timing control means 6 for controlling the electric wave emitted from the electric wave generating means 5 so that it contains the predetermined timing information, an electric wave detecting means 7 for detecting an electric wave emitted from the resonance circuit 1 of position pointing device A, a coordinate detecting means 8 for determining the coordinate value of a position pointed by position pointing device A from the electric wave detected by the electric wave detecting means 7, a resonance characteristic detecting means 9 for detecting the resonance characteristic of the resonance circuit 1 of position pointing device A from the electric wave detected at the plurality of particular timings based on the predetermined timing information, and an information reproducing means 10 for reproducing the plurality of kinds of continuous amount information from the resonance characteristic detected by the resonance characteristic detecting means 9.

The induced voltage, which contains the predetermined timing information, is produced in the resonance circuit 1 by the electric wave including the predetermined timing information emitted from the electric wave generating means 5 of tablet B. The predetermined timing information is represented by, for example, the duration of the electric wave and more particularly the duration of the electric wave which lasts for a predetermined period of time or longer and after that intermittently occurs and lasts for a certain duration, which is sufficiently shorter than the predetermined period of time, at predetermined intervals. In this case, the timing extracting means 2 detects the induced voltage occurring in the resonance circuit 1 due to the electric wave and subjects it to a low-pass filter (integrating circuit) which has a predetermined time constant in order to take out a voltage of a certain level or higher, thereby extracting the predetermined timing information.

The resonance characteristic varying means 3-1 through 3-n are constituted by elements the inductances, capacitances or resistances of which vary in accordance with an amount of a continuous operation such as the pen pressure and the rotational angle of a dial, which corresponds to continuous amount information. The resonance characteristic varying means change the resonance characteristic based on the resonance frequency, internal loss or attenuation or any combination thereof of the typical resonance circuit 1 which includes, for example, a coil and a capacitor.

The selective connecting means 4 connects in sequence the aforesaid plurality of resonance characteristic varying means 3-1 through 3-n with the resonance circuit 1 by, for instance, changing the setting of an analog switch at the particular timings based on the predetermined timing information and more particularly at the timings at which the induced voltage lasts for a predetermined period of time or longer in the resonance circuit 1 and after that intermittently occurs and lasts for a certain duration, which is sufficiently shorter than the predetermined period of time, at predetermined intervals.

The electric wave generating means 5 has a plurality of loop coils arranged in, for example, a position detecting direction or an auxiliary antenna coil provided in the vicinity thereof and an AC signal generating means for generating an AC signal for generating an electric wave for driving the resonance circuit 1 of position pointing device A, the AC signal typically having a nearly identical frequency to the resonance frequency of the resonance circuit 1. The electric wave detecting means 7 is constituted by a plurality of loop coils arranged in the same as or completely different position detecting direction from those constituting the electric wave generating means 5 or the plurality of loop coils and an auxiliary antenna coil provided in the vicinity thereof.

The timing control means 6 generates an electric wave which contains predetermined timing information represented by a duration and more particularly an electric wave which lasts for a predetermined period of time or longer and after that occurs and lasts for a certain duration, which is sufficiently shorter than the predetermined period of time, intermittently at predetermined intervals, by connecting and disconnecting, for example, the aforesaid plurality of loop coils or auxiliary antenna coil to and from the AC signal generating means.

The coordinate detecting means 8 detects, for example, the levels of a plurality of induced voltages occurring in the plurality of loop coils from the electric waves emitted by the resonance circuit 1 of position pointing device A and determines the maximum value of all the levels, i.e., the coordinate value of a position specified by position pointing device A.

The resonance characteristic detecting means 9 detects the levels of the induced voltages occurring in the aforesaid loop coils or auxiliary antenna coil or the differences in phase from the aforesaid AC signal caused by the electric waves which are generated at a plurality of particular timings based on predetermined timing information, more specifically at timings at which the resonance characteristic of the resonance circuit 1 is continuously varied in accordance with a plurality of kinds of continuous amount information among the electric waves emitted from the resonance circuit 1 of position pointing device A, the detection being carried out at each timing described above. Based on the detection result, the resonance characteristic of the resonance circuit 1 of position pointing device A is detected at each timing.

The information reproducing means 10 converts the resonance characteristics detected by the resonance characteristic detecting means 9 at each timing into a plurality of kinds of continuous amount information by referring to a table showing a relationship between the resonance characteristic and the continuous amount information and outputs the converted plural kinds of continuous amount information, the relationship being determined in advance.

In FIG. 1, the electric wave generating means 5 for generating the electric wave, which drives the resonance circuit 1 of position pointing device A, is controlled by the timing control means 6 so that the electric wave includes predetermined timing information, in which, for example, the electric wave is continuously generated for a predetermined period of time or longer, then generated intermittently for a certain duration, which is sufficiently shorter than the predetermined period of time, at predetermined intervals. The electric wave is received by the resonance circuit 1 of position pointing device A and it generates induced voltage, which includes the predetermined timing information. The timing extracting means 2 extracts the predetermined timing information from the induced voltage and supplies it to the selective connecting means 4. The selective connecting means 4 connects the plurality of resonance characteristic varying means 3-1 through 3-n to the resonance circuit 1 at a plurality of particular timings based on the predetermined timing information, e.g., the timings at which the induced voltage is intermittently generated, thereby varying the resonance characteristics such as the resonance frequency of the resonance circuit 1 in sequence in accordance with the plurality of kinds of continuous amount information.

At this time, the electric wave, which is emitted from the resonance circuit 1 and which has a different frequency from that of the electric wave produced by the electric wave generating means 5, is detected by the electric wave detecting means 7 at each timing. The resonance characteristic detecting means 9 detects in sequence the resonance characteristics of the resonance circuit 1 of position pointing device A from the electric waves detected by the electric wave detecting means 7 at the respective timings and outputs them to the information reproducing means 10. The information reproducing means 10 converts the resonance characteristics detected at the respective timings into a plurality of kinds of continuous amount information and outputs them. The coordinate detecting means 8 determines the coordinate value of the position specified by position pointing device A from the electric wave detected by the electric wave detecting means 7, e.g., from the intensity distribution thereof.

The following describes the embodiments according to the present invention with reference to the accompanying drawings.

Figure 2:
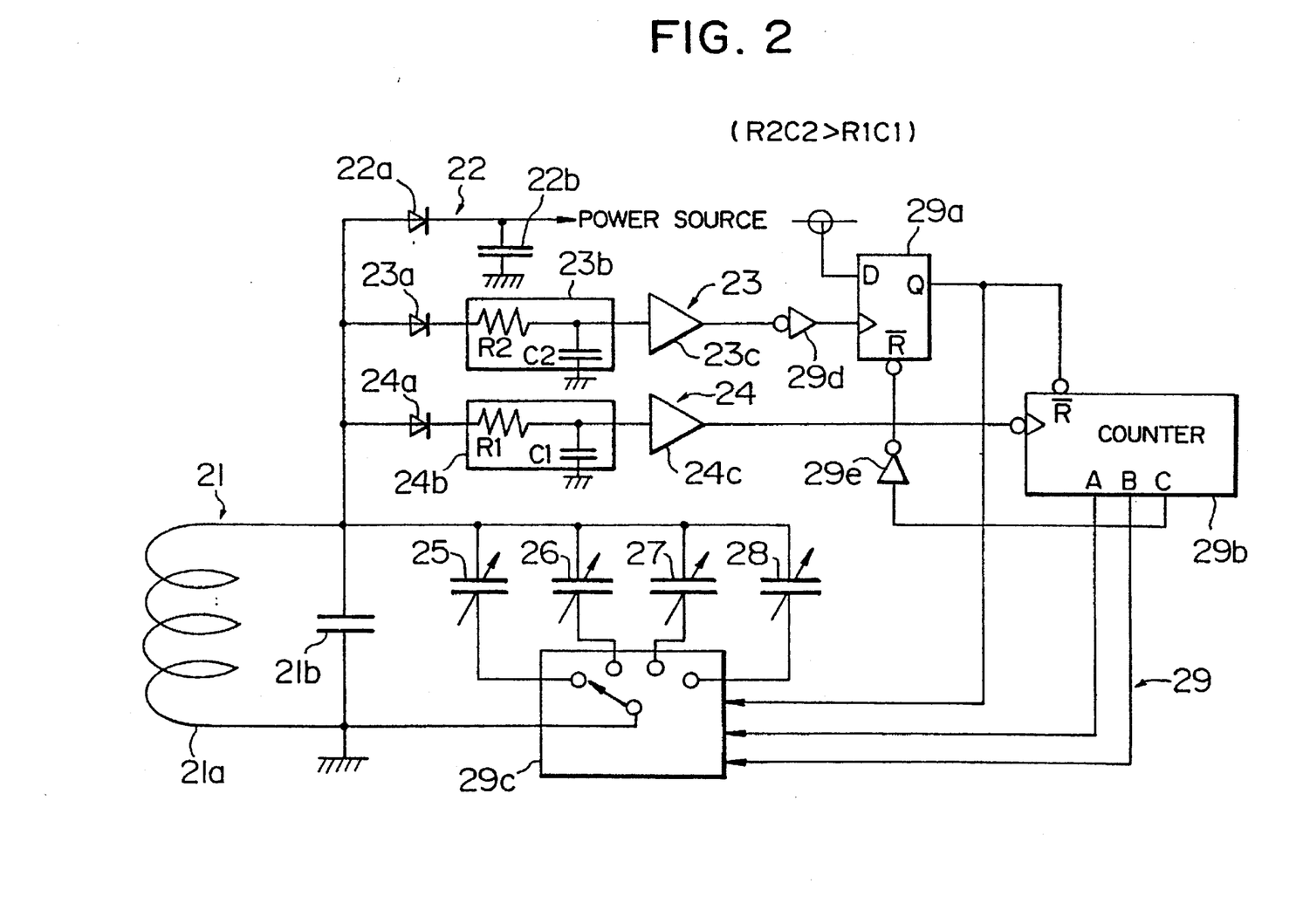
FIG. 2 is a circuit of a first embodiment of the position pointing device in accordance with the present invention.

FIG. 2 shows the first embodiment of the position pointing device according to the present invention. In the Figure, position pointing device A includes a coil 21a, capacitors 21b, 22b, diodes 22a, 23a, 24a, low-pass filters (LPF) 23b, 24b, comparators 23c, 24c, variable-capacitance capacitors 25, 26, 27, 28, a D flip-flop 29a, a counter 29b, an analog switch 29c, and inverters 29d, 29e.

The coil 21a and the capacitor 21b are connected in series and they constitute a well-known resonance circuit 21 which has a predetermined frequency as the resonance frequency thereof. The diode 22a and the capacitor 22b constitute a power circuit 22 which takes out DC voltage from the induced voltage occurring in the resonance circuit 21 and supplies it as a line voltage to other circuits.

The diode 23a, the low-pass filter 23b, and the comparator 23c constitute an actuation timing generating circuit 23, which takes out only the induced voltage lasting for a predetermined period of time or longer from the induced voltage generated in the resonance circuit 21 by using the low-pass filter 23b having a relatively large time constant (t), then shapes the waveform thereof to produce an actuation timing signal. The diode 24a, the low-pass filter 24b, and the comparator 24c constitute a clock generating circuit 24, which takes out the induced voltage, which is intermittently generated for a fixed duration, which is sufficiently shorter than the predetermined period of time, at predetermined intervals, from the induced voltage generated in the resonance circuit 21 by means of the low-pass filter 24b having a relatively small time constant (t), then shapes the waveform thereof to produce a clock. The actuation timing generating circuit 23 and the clock generating circuit 24 constitute the timing extracting means mentioned in claims 1, 2, 5, and 6.

Figure 3:
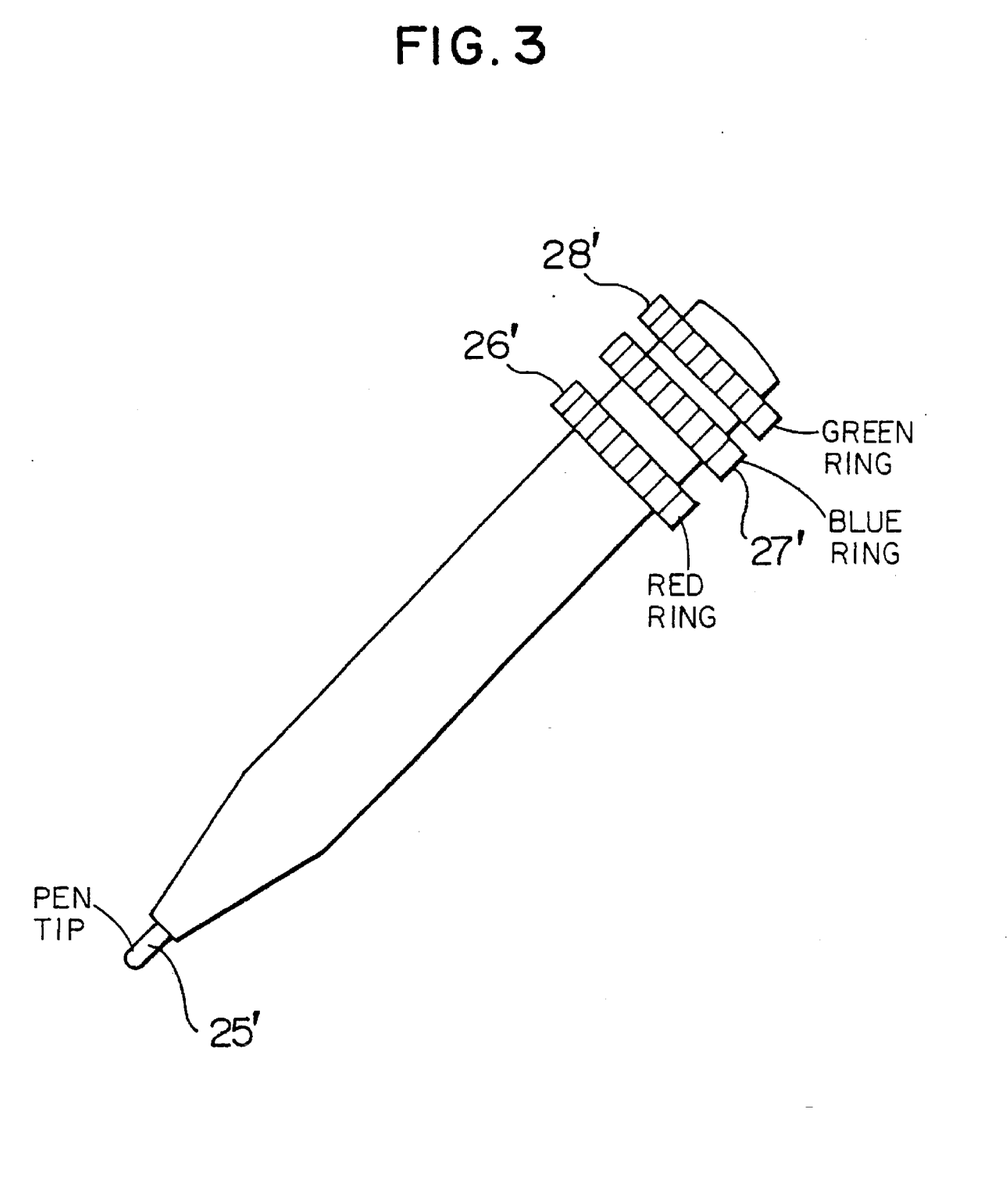
FIG. 3 is a side view of the position pointing device in accordance with a preferred embodiment the present invention.

The variable-capacitance capacitor 25 is a pressure variable-capacitance capacitor the capacitance of which varies in accordance with a continuous operation corresponding primarily to the information on the thickness of line, e.g., the pressure applied to a pen tip 25' as shown in FIG. 3, i.e., the pen pressure. The variable-capacitance capacitors 26, 27, and 28 are variable capacitors the capacitances of which vary in accordance with a continuous operation corresponding to the information on colors, namely, red, blue, and green, i.e., in accordance with, for example, set angles of rotary dial rings 26', 27', and 28' shown in FIG. 3. These variable-capacitance capacitors 25 through 28 constitute four resonance characteristic varying means, one of which is connected in parallel to the capacitor 21b of the resonance circuit 21 via the analog switch 29c at a plurality of particular timings, which will be discussed later, in order to continuously vary the resonance characteristic, i.e., the resonance frequency in this case, of the resonance circuit 21 in accordance with the aforesaid four kinds of continuous amount information. The range over which the capacitance values vary in accordance with the operation of the variable-capacitance capacitors 25 through 28 is set so that it coincides with a range (about –60° to about +60°) over which the variations in the resonance frequency of the resonance circuit 21 caused by the variations in the capacitance values can be detected in the form of phase angles in relation to the foregoing predetermined frequency.

The D flip-flop 29a is set when the actuation timing signal is received via the inverter 29d; it clears the resetting of the counter 29b and enables the analog switch 29c. The D flip-flop 29a is reset when it receives via the inverter 29e information telling that the count value of the third digit from the bottom on the counter 29b has reached 1; it resets the counter 29b and disables the analog switch 29c. The counter 29b counts the clocks while the resetting thereof is being cleared and it sends the lower two digits of the count value to the analog switch 29c. When the analog switch 29c is in an enabled state, it connects one of capacitance-variable capacitors 25 through 28 to the capacitor 21b in parallel one after another in accordance with a count value, namely, 00, 01, 10 or 11 received from the counter 29b. The circuit composed of the parts denoted by numerals 29a through 29e constitutes the selective connecting means 29 which connects in sequence the plurality of capacitance-variable capacitors 25 through 28 to the resonance circuit 21 in synchronization with a clock which follows the input of the actuation timing signal.

Figure 4:
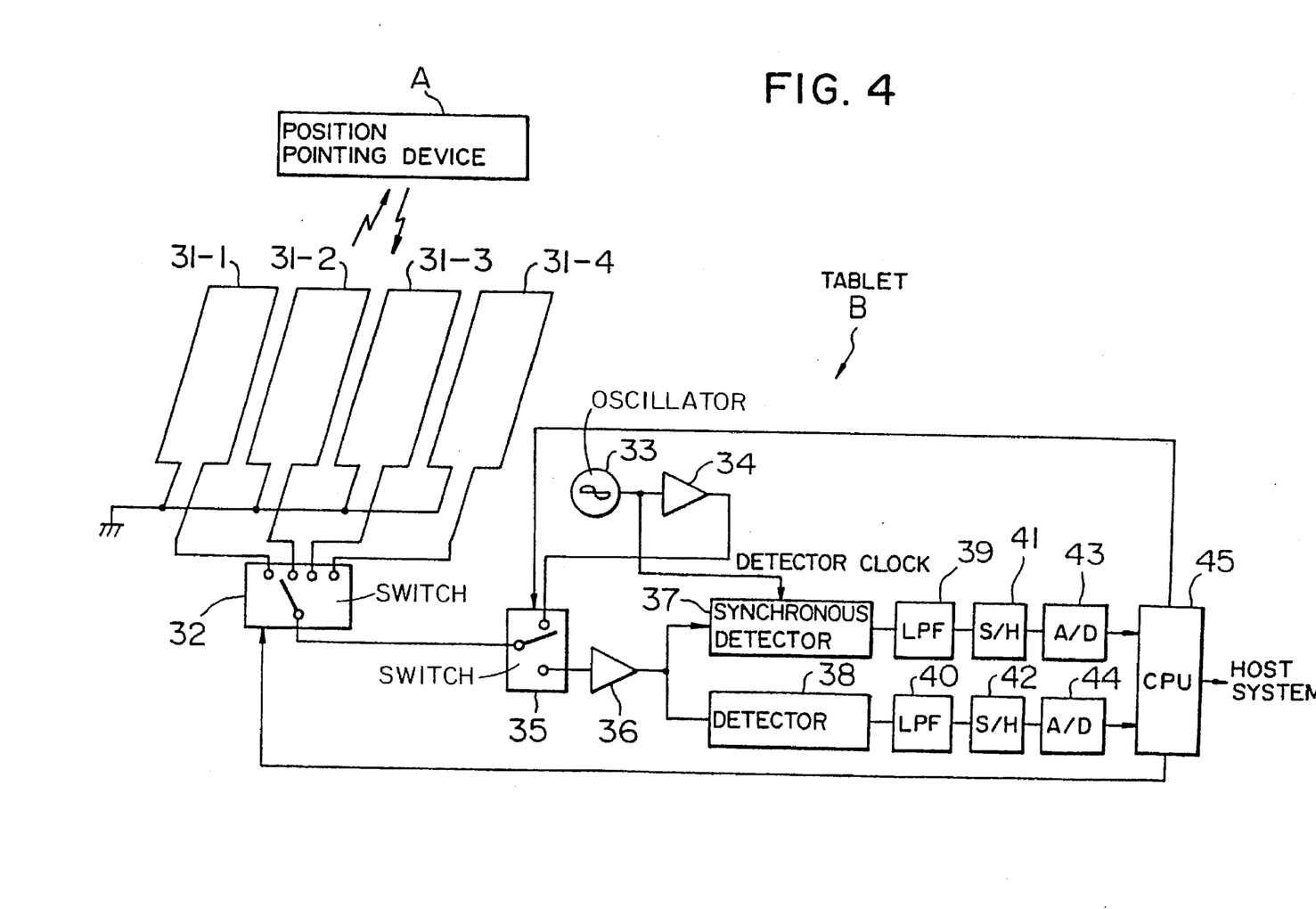
FIG. 4 is a circuit diagram of a first embodiment of the tablet of the position detecting device in accordance with the present invention.

FIG. 4 shows the first embodiment of the tablet of the position detecting device in accordance with the present invention. Tablet B in the Figure includes loop coils 31-1, 31-2, 31-3, and 31-4, a selector circuit 32, an oscillator 33, a current driver 34, a transmit/receive switching circuit 35, a receiving amplifier 36, a synchronous detector 37, a detector 38, low-pass filters (LPF) 39, 40, sample holding circuits (S/H) 41, 42, analog-to-digital (A/D) converting circuits 43, 44, and a central processing unit (CPU) 45.

The loop coils 31-1 through 31-4 are arranged nearly in parallel to each other in the position detecting direction, one end of each of them being connected to the selector circuit 32, while the other end being grounded in common. The selector circuit 32 selects one of the loop coils 31-1 through 31-4 in accordance with a selection signal received from the central processing unit 45 in a manner to be discussed later.

The oscillator 33 generates a sinusoidal AC signal having the aforesaid predetermined frequency and sends it to the current driver 34 and the synchronous detector 37. The current driver 34 converts the AC signal to an electric current and sends it to the transmit/receive switching circuit 35. The transmit/receive switching circuit 35 connects a loop coil, which has been selected by the selector circuit 32, to the current driver 34 and the receiving amplifier 36 alternately in a manner to be discussed later in accordance with a transmit/receive switching signal received from the central processing unit 45.

The receiving amplifier 36 amplifies the induced voltage, which is generated in the preselected loop coil and sent to the receiving amplifier 36 via the selector circuit 32 and the transmit/receive switching circuit 35, and sends the amplified induced voltage to the synchronous detector 37 and the detector 38.

The synchronous detector 37 synchronously detects the induced voltage generated in the preselected loop coil, i.e., the received signal, with the AC signal received from the oscillator 33 used as the detection signal and sends it to the low-pass filter 39. The detector 38 detects the induced voltage generated in the preselected loop coil, i.e., the received signal, and sends it to the low-pass filter 40.

The low-pass filters 39, 40 have a cut-off frequency, which is sufficiently lower than the resonance frequency of the resonance circuit 21, and they convert the output signals of the synchronous detector 37 and the detector 38 into DC signals and send them out to the A/D converting circuits 43, 44 via the sample holding circuits 41, 42. The A/D converting circuits 43, 44 respectively subject the outputs of the low-pass filters 39, 40 to the analog-to-digital conversion and send them out to the central processing unit 45.

The central processing unit 45 calculates the position of the resonance circuit 21 in accordance with the level distribution of the received signals, which were generated in the loop coils 31-1 through 31-4 during the coordinate detection period to be discussed later and which have been converted to digital values by the A/D converting circuit 44, and detects a phase difference in accordance with the level differences in the received signals, which were produced in the loop coil located most closely to the position of the resonance circuit 21 among the loop coils 31-1 through 31-4 at a timing immediately after the electric wave was generated continuously for a predetermined period of time or longer during the information identifying period to be discussed later and also at a timing immediately after each timing, at which the electric wave was generated intermittently for a fixed duration, which is sufficiently shorter than the predetermined period of time, at predetermined intervals, the received signals having been converted to digital values through the A/D converting circuit 43. The central processing unit 45 further detects an internal loss in accordance with the level differences in the received signals, which have been converted to digital values through the A/D converting circuit 44 (however, the internal loss remains unchanged in the position pointing device of FIG. 2), detects the resonance characteristics of the resonance circuit 21 at each timing mentioned above, and reproduces a plurality of kinds of continuous amount information by referring to a table showing the relationship between the resonance characteristics and the continuous amount information, the relationship being determined in advance.

Figure 5:
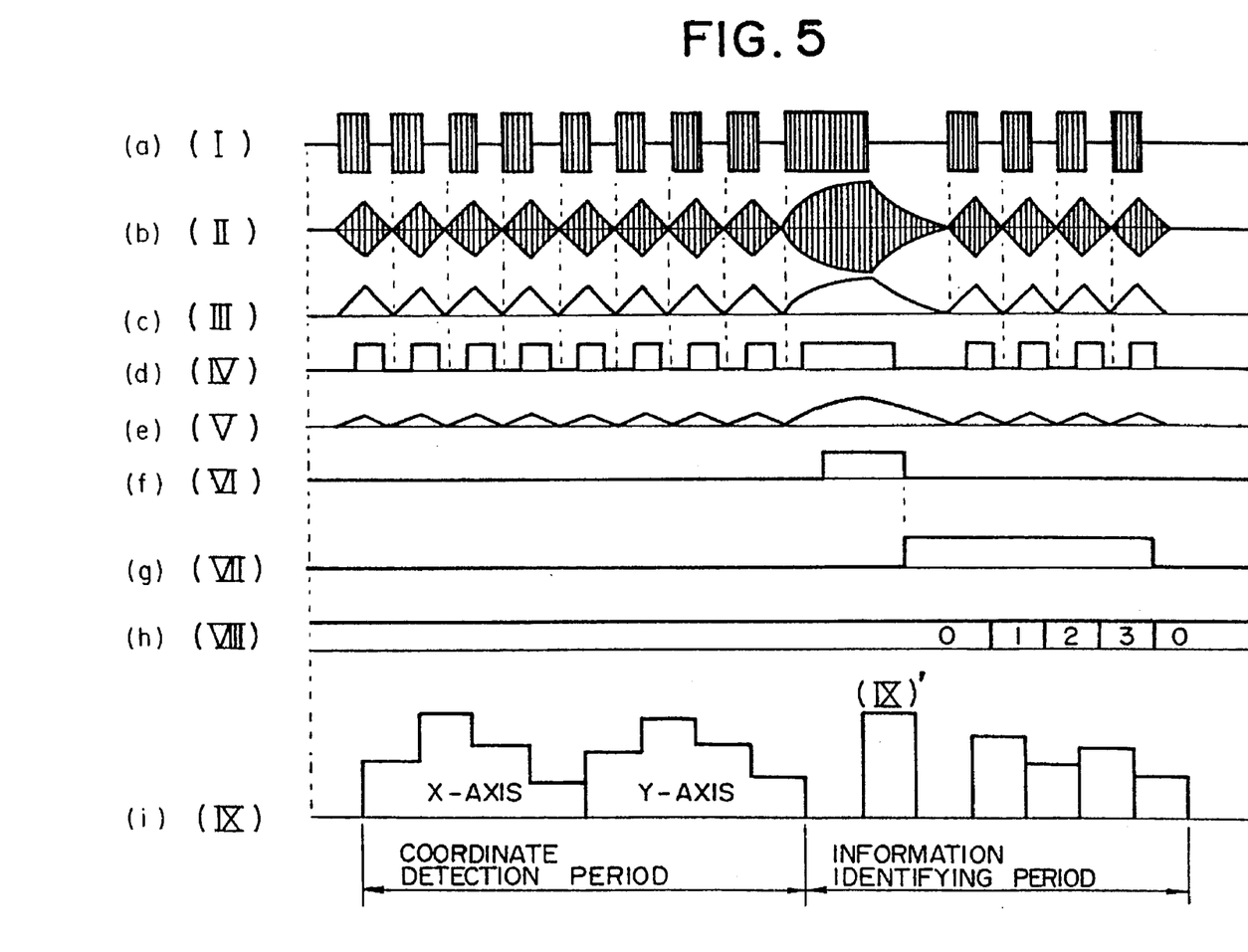
FIG. 5 includes operation signal waveforms in the first embodiment.

FIG. 5 illustrates the operation waveforms in the first embodiment. The following describes the operations of the position detecting device and the position pointing device in connection with the Figure. Tablet B described previously is designed for position detection in one direction; however, in this embodiment, a plurality of loop coils similar to the loop coils 31-1 through 31-4 are arranged so that they cross orthogonally therewith, a selector circuit similar to that described above is provided, and other circuits are selectively used so as to perform alternate position detection, thus detecting a pointed position in two orthogonal directions (x and y directions). The Figure shows the waveforms obtained from the configuration described above.

The operations of the devices are roughly divided into those carried out during the coordinate detection period and those carried out during the information identifying period, and these two types of operations are normally repeated alternately.

During the coordinate detection period, the central processing unit 45 controls the transmit/receive switching circuit 35 so that the output of the selector circuit 32 is connected to the current driver 34 and the receiving amplifier 36 alternately for a predetermined duration at fixed intervals, and also controls the selector circuit 32 so that the loop coil located most closely to position pointing device A is selected among the loop coils 31-1 through 31-4 while the output of the selector circuit 32 is being connected to the current driver 34, i.e., while the electric current is being generated, and the loop coils 31-1 through 31-4 are selected in sequence while the output of the selector circuit 32 is being connected to the receiving amplifier 36, i.e., while the electric wave is being detected.

During the information identifying period, the central processing unit 45 controls the transmit/receive switching circuit 35 so that the output of the selector circuit 32 is connected continuously to the current driver 34 for not less than a predetermined period of time, which is sufficiently longer than the predetermined duration mentioned above; and after that connected alternately to the current driver 34 and the receiving amplifier 36 for a fixed duration, which is sufficiently shorter than the predetermined period of time, at predetermined intervals, and it also controls the selector circuit 32 so that the loop coil located most closely to position pointing device A is selected among the loop coils 31-1 through 31-4 while the output of the selector circuit 32 is being connected to the current driver 34, i.e., while the electric current is being generated and also while it is being connected to the receiving amplifier 36, i.e., while the electric current is being detected.

The operation of the tablet during the coordinate detection period is not discussed because it is already disclosed in the previously mentioned Japanese Patent Laid-Open Nos. 63-70326, 3-189716, and 3-189717, etc. Electric current I, which is generated for a predetermined duration at fixed intervals in the loop coil closest to the resonance circuit 21 of position pointing device A of tablet B during the coordinate detection period causes similar induced voltage II to appear in the resonance circuit 21 of position pointing device A. Induced voltage II is shaped into clock IV by the comparator 24c via the diode 24a and the low-pass filter 24b (III) of the clock generating circuit 24 and clock IV is supplied to the counter 29b. At this time, however, there is no actuation timing signal; therefore, the counter 29b does not initiate counting and the analog switch 29c is not actuated. Accordingly, the resonance characteristics of the resonance circuit 21 remain unchanged.

During the information identifying period, which follows the coordinate detection period, when electric wave I lasting for not less than a predetermined period of time, which is sufficiently longer than the aforesaid predetermined duration, is emitted from the loop coil closest to the resonance circuit 21 of position pointing device A of tablet B, electric wave I causes like induced voltage II to appear in the resonance circuit 21 of position pointing device A. Induced voltage II in turn causes the comparator 23c to generate actuation timing signal VI via the diode 23a and the low-pass filter 23b (V) of the actuation timing generating circuit 23. Actuation timing signal VI sets (VII) the D flip-flop 29a via the inverter 29d, causes the counter 29b to initiate counting, and enables the analog switch 29c.

After that, electric wave I generated in the loop coil closest to the resonance circuit 21 of position pointing device A of tablet B for a fixed duration, which is sufficiently shorter than the predetermined period of time, at predetermined intervals causes like induced voltage II to be generated in the resonance circuit 21 of position pointing device A, and it is shaped into clock IV before it is supplied to the counter 29b, output value VIII of the counter 29b incrementing each time clock IV is received.

Induced voltage II based on the electric wave, which has lasted for the predetermined period of time or longer, causes received signal (induced voltage) IX' to be produced in the loop coil located most closely to the resonance circuit 21 of position pointing device A of tablet B as in the coordinate detection period. At this point, however, the D flip-flop 29a is in the reset state and the analog switch 29c is in the disabled state; therefore, none of the variable-capacitance capacitors 25 through 28 are connected to the resonance circuit 21. Hence, the output values of the A/D converting circuits 43, 44 based on the induced voltage IX' provide the reference values for detecting the phase difference and internal loss, respectively.

Then, the D flip-flop 29a is set, causing the analog switch 29c to be enabled, and the analog switch 29c connects the variable-capacitance capacitors 25 through 28 one by one to the resonance circuit 21 each time output value VIII of the counter 29b is updated, thereby to vary the resonance characteristic of the resonance circuit 21.

Such a variation in the resonance characteristic causes a variation in the frequency or voltage value of induced voltage IX generated in the loop coil closest to the resonance circuit 21 of position pointing device A of tablet B; the variation is sent out from the A/D converting circuit 43 or 44 as an output value, which has a level different from the output value based on induced voltage IX'. The central processing unit 45 compares the output values of the A/D converting circuits 43, 44, which are obtained in synchronization with the timing of the electric wave, which is intermittently produced for a fixed duration at predetermined intervals, with the output values of the A/D converting circuits 43, 44, which are obtained in synchronization with the timing of the electric wave, which is continuously generated for the predetermined period of time or longer, in order to detect the phase difference and internal loss. The central processing unit 45 also detects the variation in the resonance characteristic, namely, the variation in the resonance frequency caused by the capacitance-variable capacitors 25 through 28. Based on the detected phase difference and internal loss, the central processing unit 45 reproduces the four pieces of continuous amount information, namely, the information on the line thickness, the color information on red, that on blue, and that on green, and send these pieces of information to a host system together with the coordinate value of the pointed position.

After that, the coordinate detection period comes again and the same coordinate detection and code identification as those discussed above are repeated.

Thus, according to this embodiment, in position pointing device A, the resonance frequency of the resonance circuit 21 is changed in accordance with a plurality of kinds of continuous amount information at a plurality of particular timings, while in tablet B, the variations in the resonance frequency of the resonance circuit 21 are determined from the phase differences between the induced voltages occurring at the plurality of particular timings and the sent electric waves, thereby transmitting a plurality of kinds of continuous amount information. This makes it possible for the varying range of the resonance frequency corresponding to a preselected piece of continuous amount information to coincide with the range over which variations in the resonance frequency can be detected as the phase angles with respect to the predetermined frequency. Hence, the varying range of transmissive information is not limited, and moreover, only one type of frequency is required for the electric waves transmitted from the tablet, eliminating the need for a wider frequency domain.

Figure 6:
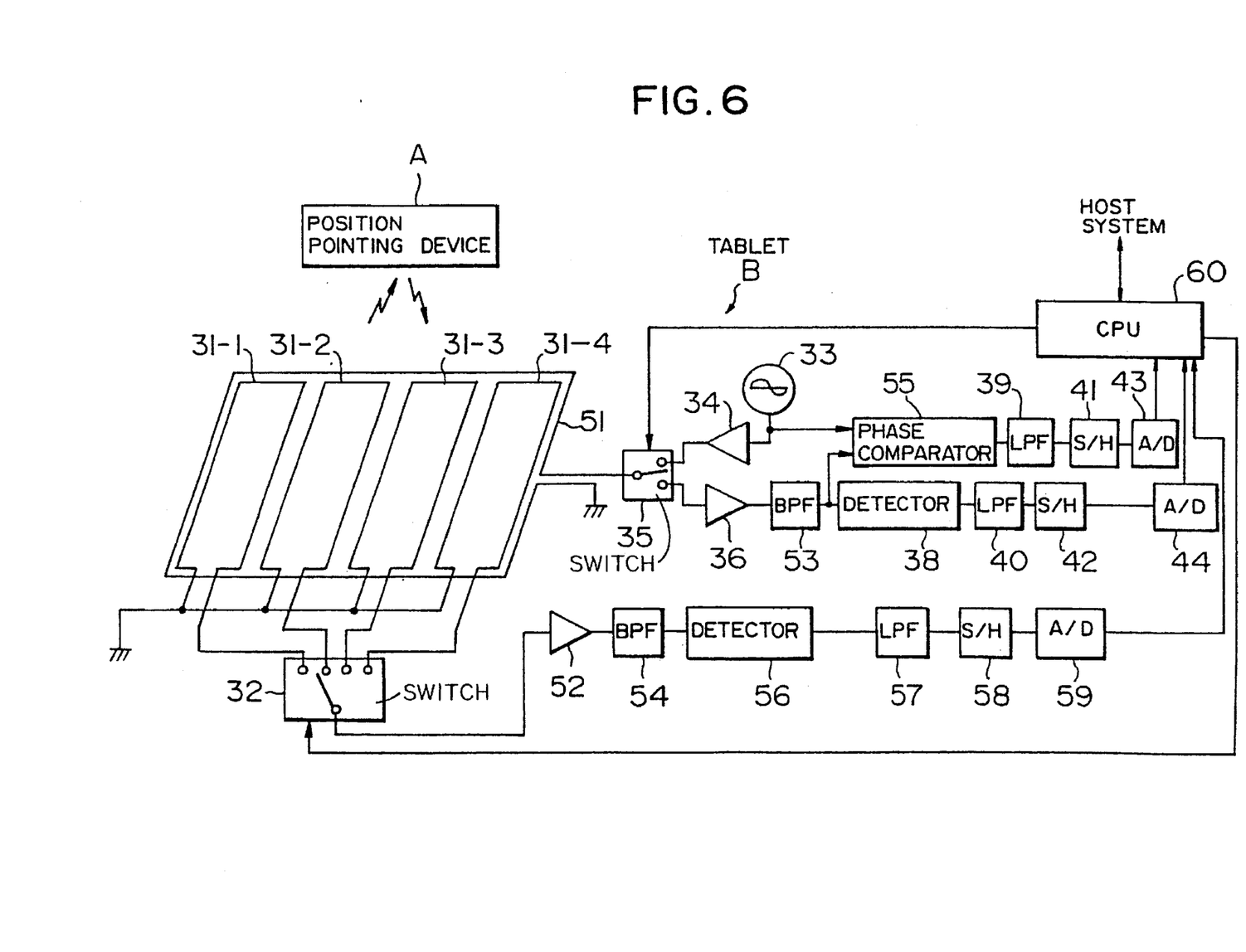
FIG. 6 is a circuit diagram of a second embodiment of the tablet of the position detecting device in accordance with the present invention.

FIG. 6 illustrates the second embodiment of the tablet of the position detecting device according to the present invention. This embodiment illustrates an example, wherein an auxiliary antenna coil is used to generate electric waves and to receive electric waves related to information identification. In the Figure, numeral 51 denotes an auxiliary antenna coil, which is arranged so as to surround the loop coils 31-1 through 31-4, one sides thereof being connected to a switching circuit 35, while the other sides thereof being grounded. Numeral 52 denotes a receiving amplifier connected directly to the selector circuit 32.

Numerals 53, 54 indicate band-pass filters which employ the predetermined frequency, i.e., the resonance frequency of the resonance circuit 21, as the center frequency. The band-pass filters 53, 54 take out only components in the vicinity of the resonance frequency from the induced voltage mentioned above via the receiving amplifiers 36 and 52, respectively. Numeral 55 denotes a phase comparator, which compares the phase of an output signal of the band-pass filter 53, i.e., the resonance frequency component of the induced voltage generated in the auxiliary antenna coil 51, and the phase of the AC signal received from the oscillator 33 and sends out a phase difference signal to the low-pass filter 39.

A detector 56, a low-pass filter (LPF) 57, a sample holding circuit (S/H) 58, and an analog-to-digital (A/D) converting circuit 59 detect received signals, which are generated in the loop coils 31-1 through 31-4 and output via the selector circuit 32, the receiving amplifier 52, and the band-pass filter 54, convert them into DC signals, and further convert the DC signals to digital signals.

A central processing unit (CPU) 60 calculates the position of the resonance circuit 21 in accordance with the level distribution of the received signals, which were generated in the loop coils 31-1 through 31-4 during the coordinate detection period and which have been converted to digital values by the A/D converting circuit 59, and detects the phase differences in accordance with the level differences in the phase difference signals which were produced at timings immediately after the electric waves were continuously generated in the auxiliary antenna coil 51 for a predetermined period of time or longer during the information identifying period and at timings immediately after the electric waves were emitted intermittently at predetermined intervals for a certain duration which is sufficiently shorter than the above predetermined period of time, the level differences having been converted into digital values through the A/D converting circuit 43. The central processing unit 60 also detects the internal loss based on the level differences of the received signals converted into the digital values through the A/D converting circuit 44, and based on the detection results, the central processing unit 60 detects the resonance characteristics of the resonance circuit 21 at the respective timings mentioned above, thus reproducing the plurality of kinds of continuous amount information.

According to this embodiment, the auxiliary antenna coil is employed to generate electric waves and to receive electric waves associated with information identification. This eliminates the need for selecting a loop coil in accordance with the position of position pointing device A when an electric wave is generated during the coordinate detection period or during the information identifying period, thus permitting quicker movement of position pointing device A and reduced load on the central processing unit 60.

Figure 7:
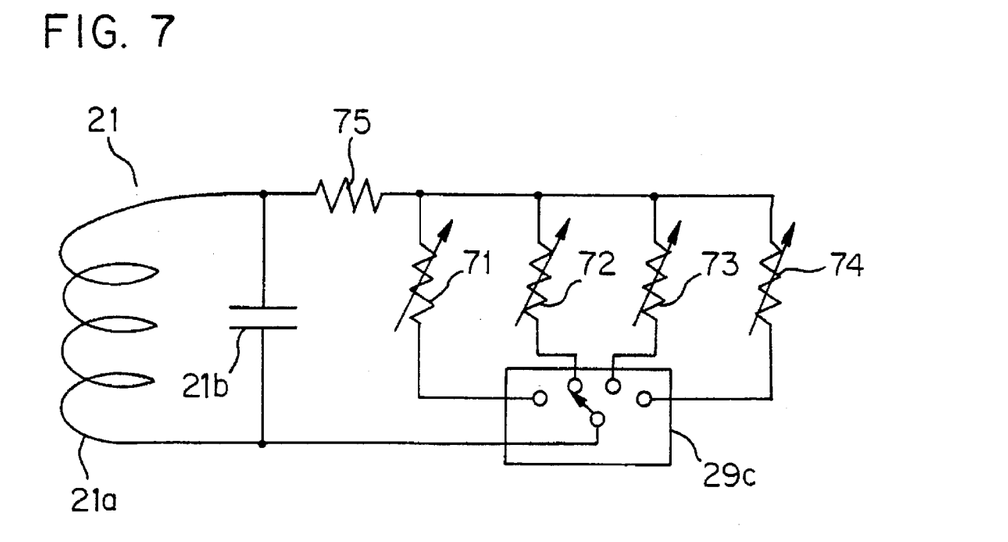
FIG. 7 is a circuit diagram of a second embodiment of the position pointing device in accordance with the present invention.

FIG. 7 shows the second embodiment of the position pointing device in accordance with the present invention. This embodiment illustrates an example, wherein the resonance characteristic of the resonance circuit is changed by changing the internal loss.

In the drawing, numerals 71, 72, 73, and 74 denote variable resistors the resistances of which vary in accordance with the continuous amount information. These variable resistors constitute four resonance characteristic varying means which continuously vary the resonance characteristic, i.e., the internal loss in this embodiment, of the resonance circuit 21 in accordance with the continuous amount information by connecting in parallel one of them to the capacitor 21b of the resonance circuit 21 via the analog switch 29c at a plurality of particular timings. The range over which the resistance varies according to the operation of the variable resistors 71 through 74 is set so that the range over which the internal loss of the resonance circuit 21 varies due to the variations in the resistances coincides with the range in which such variations can be detected by tablet B.

A resistor 75 is inserted so that the resonance circuit 21 stays resonant even when the resistances of all the variable resistors 71 through 74 are zero; otherwise, the resonance circuit 21 would stop resonating and no clock would be supplied to the counter 29b, preventing proper transmission of information. The rest of the configuration is identical to the configuration of the embodiment of FIG. 2; this embodiment is also equipped with like power circuit 22, actuation timing generating circuit 23, clock generating circuit 24, and selective connecting means 29 although they are not shown. The position pointing device can directly be applied to the position detecting device of FIG. 3 or FIG. 6 only by adding a slight change to the information reproducing processing program.

According to the position pointing device of this embodiment, the plurality of kinds of continuous amount information can be transmitted as variations in the internal loss of the resonance circuit 21, i.e., as the variations in the intensity of the signals received by tablet B.

Figure 8:
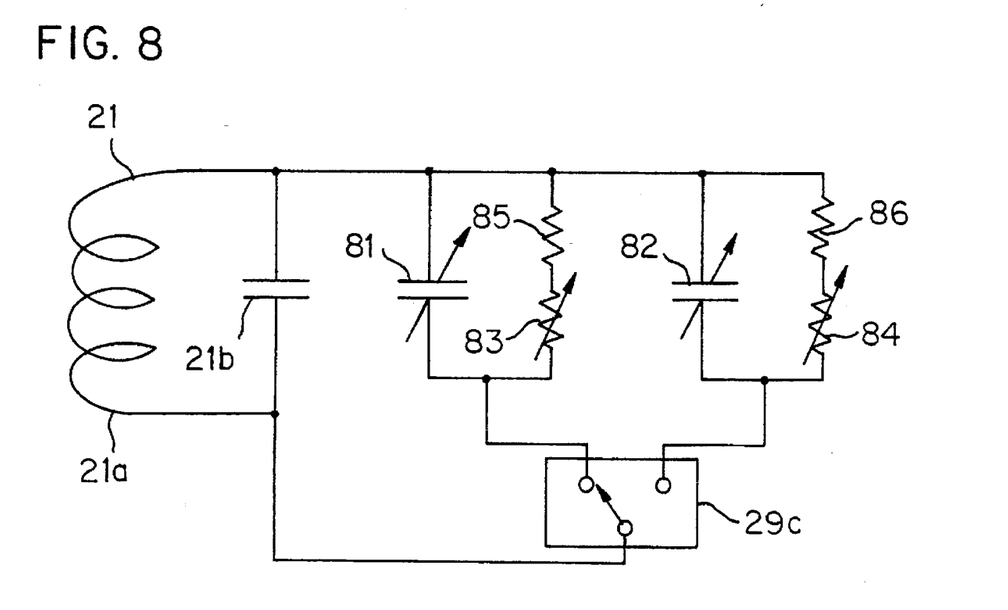
FIG. 8 is a circuit diagram of a third embodiment of the position pointing device in accordance with the present invention.

FIG. 8 illustrates the third embodiment of the position pointing device in accordance with the present invention. This embodiment shows an example wherein the resonance characteristic of the resonance circuit is changed by changing the resonance frequency and the internal loss.

In the drawing, numerals 81, 82 denote variable-capacitance capacitors the capacitances of which vary in accordance with the continuous amount information and numerals 83, 84 denote variable resistors the resistances of which vary in accordance with the continuous amount information. They constitute four resonance characteristic varying means which continuously vary the resonance characteristics, namely, the resonance frequency and the internal loss, of the resonance circuit 21 in accordance with the continuous amount information by connecting in parallel two of them, i.e., the variable-capacitance capacitor 81 and the variable resistor 83, or the variable-capacitance capacitor 82 and the variable resistor 84 to the capacitor 21b of the resonance circuit 21 at the same time via the analog switch 29c' at the plurality of particular timings.

The range over which the capacitances vary according to the operation of the variable capacitors 81, 82 is set so that the range over which the resonance frequency of the resonance circuit 21 varies according to the variations in the capacitances coincides with the range (about −60° to about +60°) over which such variations can be detected in the form of phase angles in relation to the predetermined frequency. Likewise, the range over which the resistances vary according to the operation of the variable resistors 83, 84 is set so that the range over which the internal loss of the resonance circuit 21 varies due to the variations in the resistances coincides with the range in which such variations can be detected by tablet B.

Resistors 85, 86 are inserted so that the resonance circuit 21 stays resonant even when the capacitances of the variable-capacitance capacitors 81, 82 are zero and the resistances of the variable resistors 83, 84 are also zero; otherwise, the resonance circuit 21 would stop resonating and no clock would be supplied to the counter 29b, preventing proper transmission of information. The rest of the configuration is identical to the configuration of the embodiment of FIG. 2; this embodiment is also equipped with like power circuit 22, actuation timing generating circuit 23, clock generating circuit 24, and selective connecting means 29 although they are not shown. The position pointing device can directly be applied to the position detecting device of FIG. 3 or FIG. 6 only by adding a slight change to the information reproducing processing program.

According to the position pointing device of this embodiment, two pieces of continuous amount information can be transmitted at one particular timing; therefore, a shorter information identifying period can be achieved with resultant faster sampling for coordinate detection.

The position pointing device in the above embodiments obtain the power for driving the circuits from the resonance circuit; alternatively, however, a separate power source such as a battery may be provided. Further, the embodiments are concerned with the examples, wherein the present invention is applied to the type of device designed to perform coordinate detection by alternately exchanging electric waves between the position pointing device and the tablet; however, the present invention can be applied likewise also to a type of device, which is designed to continuously exchange electric waves, by intermittently exchanging electric waves only during the information identifying period. Furthermore, in the embodiments, the predetermined timing information is transmitted in the form of the duration of an electric wave; however, it may alternatively be transmitted by employing frequency-modulated electric waves.

Thus, according to the present invention, the position pointing device is provided with a timing extracting means for extracting predetermined timing information from the induced voltage which occurs in the resonance circuit and which includes the predetermined timing information, a plurality of resonance characteristic varying means for continuously varying the resonance characteristic of the resonance circuit in accordance with a plurality of kinds of continuous amount information, and a selective connecting means for sequentially connecting the plurality of resonance characteristic varying means to the resonance circuit at a plurality of particular timings based on the predetermined timing information, and the tablet is provided with a timing control means for controlling the electric wave generated by the electric wave generating means so that it contains the predetermined timing information, a resonance characteristic detecting means for detecting the resonance characteristic of the resonance circuit of the position pointing device from the electric waves detected at the plurality of particular timings based on the predetermined timing information by the electric wave detecting means, and an information reproducing means for reproducing the plurality of kinds of continuous amount information from the detected resonance characteristics; therefore, the range over which the resonance characteristic corresponding to a particular piece of continuous amount information varies can be set to fully coincide with the range over which such variations are detectable. This prevents the transmissive information varying range from being limited, and requires only one type of frequency for the electric waves transmitted from the tablet. Thus, a plurality of kinds of continuous amount information can be transmitted without the need for a wider frequency domain.

Further, accurate transmission of a plurality of particular timings from the tablet to the position pointing device can be accomplished and therefore a plurality of kinds of continuous amount information can be securely transferred from the position pointing device to the tablet by providing the position pointing device with a timing extracting means for extracting a timing at which the induced voltage lasts for a predetermined period of time or longer and after that intermittently occurs and lasts for a certain duration, which is sufficiently shorter than the predetermined period of time, at predetermined intervals, and by providing the tablet with a timing control means for controlling the timings of the electric wave so that the electric wave occurs intermittently at certain intervals and lasts for a predetermined duration during the coordinate detection period but occurs and lasts for not less than a predetermined period of time, which is sufficiently longer than the predetermined duration during the information identifying period and after that intermittently occurs and lasts for a certain duration, which is sufficiently shorter than the predetermined period of time, at predetermined intervals.

Furthermore, the use of the resonance frequency of the resonance circuit as the resonance characteristic to be continuously varied permits easy change of the resonance characteristic by a variable-capacitance capacitor the capacitance of which is varied according to the pen pressure or the rotational angle of a dial ring.

Moreover, the use of the internal loss of the resonance circuit as the resonance characteristic to be continuously varied permits easy change of the resonance characteristic by a variable resistor.

Further, the use of the resonance frequency and the internal loss of the resonance circuit as the resonance characteristics to be continuously varied allows two pieces of continuous amount information to be transmitted at a single particular timing. This leads to a shorter information identifying period with a consequent higher sampling speed for coordinate detection.

In addition, the battery can be eliminated from the position pointing device by providing a power extracting means for extracting electrical energy for driving all the component units from the electric waves received by the resonance circuit.

What is claimed is:

1. A position detecting device having a position pointing device and a tablet:

said position pointing device comprising:

a resonance circuit, timing extracting means for extracting predetermined timing information from induced voltage which occurs in said resonance circuit and which includes said predetermined timing information, a plurality of resonance characteristic varying means for continuously varying the resonance characteristic of said resonance circuit in accordance with a plurality of kinds of continuous amount information, and selective connecting means for connecting in sequence said plurality of resonance characteristic varying means to said resonance circuit at a plurality of particular timings based on said predetermined timing information, and said tablet comprising:

electric wave generating means for generating an electric wave for driving the resonance circuit of the position pointing device, timing control means for controlling said electric wave so that it includes the predetermined timing information, electric wave detecting means for detecting an electric wave emitted from the resonance circuit of the position pointing device, coordinate detecting means for determining a coordinate value of a position pointed by the position pointing device from said detected electric wave, resonance characteristic detecting means for detecting the resonance characteristic of the resonance circuit of the position pointing device from the electric waves detected at the plurality of particular timings based on the predetermined timing information, and information reproducing means for reproducing a plurality of kinds of continuous amount information from said detected resonance characteristic.

2. A position detecting device having a position pointing device and a tablet;

said position pointing device comprising:

a resonance circuit, timing extracting means for extracting a timing at which induced voltage occurs in said resonance circuit and lasts for a predetermined period of time or longer and after that intermittently occurs and lasts for a certain duration which is sufficiently shorter than said predetermined period of time at predetermined intervals, a plurality of resonance characteristic varying means for continuously varying the resonance characteristic of said resonance circuit in accordance with a plurality of kinds of continuous amount information, and a selective connecting means for connecting said plurality of resonance characteristic varying means to said resonance circuit at each timing at which said induced voltage occurs intermittently, and said tablet comprising:

electric wave generating means for generating an electric wave for driving the resonance circuit of the position pointing device, timing control means for controlling said electric wave so that it intermittently occurs for a predetermined duration at certain intervals during a coordinate detection period and it continuously occurs for not less than a predetermined period of time which is sufficiently longer than said predetermined duration during an information identifying period then after that intermittently occurs for a certain duration, which is sufficiently shorter than said predetermined period of time, at predetermined intervals, electric wave detecting means for detecting an electric wave generated from the resonance circuit of the position pointing device, coordinate detecting means for determining a coordinate value of a position specified by the position pointing device from an electric wave detected during the coordinate detection period, resonance characteristic detecting means for detecting a resonance characteristic of the resonance circuit of the position pointing device from an electric wave detected immediately after the timing at which the electric wave intermittently occurs during the information identifying period, and information reproducing means for reproducing a plurality of continuous amount information from said detected resonance characteristic.

3. A position detecting device having a position pointing device and a tablet:

said position pointing device comprising;

a resonance circuit, an actuation timing generating circuit for extracting a timing at which induced voltage occurs and lasts for a predetermined period of time or longer in said resonance circuit, thereby to generate an actuation timing signal, a clock generating circuit for extracting a timing at which the induced voltage occurs intermittently in the resonance circuit at predetermined intervals and lasts for a certain duration which is sufficiently shorter than said predetermined period of time, thereby to generate a clock, a plurality of resonance characteristic varying means for continuously varying the resonance characteristic of said resonance circuit in accordance with a plurality of kinds of continuous amount information, and selective connecting means for connecting in order said plurality of resonance characteristic varying means to said resonance circuit in synchronization with a clock after said actuation timing signal is received, and said tablet comprising:

a plurality of loop coils arranged in a position detecting direction, selecting means for selecting a loop coil out of said plurality of loop coils, level detecting means for detecting a level of induced voltage generated in said selected loop coil, AC signal generating means for generating an AC signal for generating an electric wave for driving the resonance circuit of said position pointing device, phase difference detecting means for detecting a phase difference between said AC signal and induced voltage occurring in said selected loop coil, switching and connecting means for switching and connecting said AC signal generating means, and level detecting means and phase difference detecting means to said selected loop coil, switching control means for controlling said switching and connecting means so that said AC signal generating means, and said level detecting means and said phase difference detecting means are alternately connected to said selected loop coil for a predetermined duration at fixed intervals during the coordinate detection period, while said AC signal generating means is continuously connected to said selected loop coil for not less than a predetermined period of time, which is sufficiently longer than said predetermined duration, during the information identifying period, and after that, said AC signal generating means is alternately connected to said level detecting means and said phase difference detecting means for a fixed duration, which is sufficiently shorter than said predetermined period of time, at predetermined intervals, selection control means for controlling said selecting means so that a loop coil, which is located most closely to the position pointing device, is selected among said plurality of loop coils during connection to said AC signal generating means in the coordinate detection period, a loop coil is selected in sequence from said plurality of loop coils during connection to said level detecting means and said phase difference detecting means, and a loop coil closest to the position pointing device is selected among said plurality of loop coils during the information identifying period, coordinate value calculating means for determining a coordinate value of a position specified by the position pointing device in accordance with the level of induced voltage detected by said level detecting means, resonance characteristic detecting means for detecting the resonance characteristic of the resonance circuit of said position pointing device from the level of induced voltage detected by said level detecting means and the phase difference in induced voltage detected by said phase difference detecting means, and information reproducing means for reproducing a plurality of kinds of continuous amount information from said detected resonance characteristic.

4. A position detecting device having a position pointing device and a tablet:

said position pointing device comprising:

a resonance circuit, an actuation timing generating circuit for extracting a timing, at which induced voltage occurs in said resonance circuit and lasts for a predetermined period of time or longer, thereby to generate an actuation timing signal, a clock generating circuit for extracting a timing, at which the induced voltage intermittently occurs in the resonance circuit and lasts for a fixed duration, which is sufficiently shorter than said predetermined period of time, at predetermined intervals, thereby to generate a clock, a plurality of resonance characteristic varying means for continuously varying the resonance characteristic of said resonance circuit in accordance with a plurality of kinds of continuous amount information, and selective connecting means for connecting in sequence said plurality of resonance characteristic varying means to said resonance circuit in synchronization with a clock which follows the input of said actuation timing signal, and said tablet comprising:

a plurality of loop coils arranged in a position detecting direction, selecting means for selecting a loop coil out of said plurality of loop coils, first level detecting means for detecting a level of induced voltage generated in said selected loop coil, an auxiliary antenna coil provided in the vicinity of said plurality of loop coils, second level detecting means for detecting a level of induced voltage generated in said auxiliary antenna coil, AC signal generating means for generating an AC signal for generating an electric wave for driving the resonance circuit of said position pointing device, phase difference detecting means for detecting a phase difference between said AC signal and the induced voltage generated in said auxiliary antenna coil, switching and connecting means for switching and connecting said AC signal generating means, and said second level detecting means and said phase difference detecting means to said auxiliary antenna coil, switching control means for controlling said switching and connecting means so that said AC signal generating means is intermittently connected to said auxiliary antenna coil for a predetermined duration at fixed intervals during the coordinate detection period, while said AC signal generating means is continuously connected to said auxiliary antenna coil for not less than a predetermined period of time, which is sufficiently longer than said predetermined duration, during the information identifying period, and after that said AC signal generating means is alternately connected to said second level detecting means and said phase difference detecting means for a fixed duration, which is sufficiently shorter than said predetermined period of time, at predetermined intervals, selection control means for controlling said selecting means so that no loop coil is selected during the information identifying period and while said auxiliary antenna coil is being connected to said AC signal generating means during the coordinate detection period, and a loop coil is selected in sequence from said plurality of loop coils while said auxiliary antenna coil is not being connection to said AC signal generating means during the coordinate detection period, coordinate value calculating means for determining a coordinate value of a position specified by the position pointing device in accordance with the level of induced voltage detected by said first level detecting means, resonance characteristic detecting means for detecting the resonance characteristic of the resonance circuit of said position pointing device from the level of induced voltage detected by said second level detecting means and the phase difference of induced voltage detected by said phase difference detecting means, and information reproducing means for reproducing a plurality of kinds of continuous amount information from said detected resonance characteristic.

5. A position pointing device for use with a position detecting tablet comprising:

a resonance circuit, timing extracting means for extracting predetermined timing information from induced voltage, which includes said predetermined timing information and which occurs in said resonance circuit, resonance characteristic varying means for continuously varying the resonance characteristic of said resonance circuit in accordance with a plurality of kinds of continuous amount information, and a selective connecting means for connecting in sequence said plurality of resonance characteristic varying means to said resonance circuit at a plurality of particular timings based on said predetermined timing information.

6. A position pointing device for use with a position detecting tablet comprising:

a resonance circuit, timing extracting means for extracting a timing, at which induced voltage lasts for a predetermined period of time or longer in said resonance circuit, then intermittently occurs and lasts for a fixed duration, which is sufficiently shorter than said predetermined period of time, at predetermined intervals, a plurality of resonance characteristic varying means for continuously varying the resonance characteristic of said resonance circuit in accordance with a plurality of kinds of continuous amount information, and selective connecting means for connecting said plurality of resonance characteristic varying means to said resonance circuit at each timing at which said induced voltage occurs intermittently.

7. A position pointing device for use with a position detecting tablet comprising:

a resonance circuit, an actuation timing generating circuit for extracting a timing, at which induced voltage occurs in said resonance circuit and lasts for a predetermined period of time or longer, thereby to generate an actuation timing signal, a clock generating circuit for extracting a timing, at which the induced voltage intermittently occurs in the resonance circuit and lasts for a fixed duration, which is sufficiently shorter than said predetermined period of time, at predetermined intervals, thereby to generate a clock, a plurality of resonance characteristic varying means for continuously varying the resonance characteristic of said resonance circuit in accordance with the plurality of kinds of continuous amount information, and selective connecting means for connecting in sequence said plurality of resonance characteristic varying means to said resonance circuit in synchronization with a clock which follows the input of said actuation timing signal.

8. A position pointing device according to claim 5, wherein the resonance frequency of the resonance circuit is employed as the resonance characteristic to be varied continuously.

9. A position pointing device according to claim 5, wherein the internal loss of the resonance circuit is employed as the resonance characteristic to be varied continuously.

10. A position pointing device according to claim 5, wherein the resonance frequency and the internal loss of the resonance circuit are employed as the resonance characteristics to be varied continuously.

11. A position pointing device according to claim 5, comprising power extracting means for extracting electrical energy for driving component units from an electric wave received by the resonance circuit.

12. A position pointing device for use with a position detecting tablet for emitting an AC field having a predetermined frequency and a first predetermined detectable characteristic followed by sequential second predetermined detectable characteristics, the device comprising processing circuitry and a resonant circuit responsive to the AC field, the AC field and the resonant circuit being such that the processing circuitry is supplied with a first impulse and sequential second impulses by the resonant circuit in response to the AC field having the predetermined frequency and the first predetermined detectable characteristic followed by the sequential predetermined detectable characteristics, a variable impedance connected in circuit with the resonant circuit, the processing circuitry responding to the first impulse and the sequential second impulses so that in response to the sequential second impulses that occur after the first impulse different values of the variable impedance are respectively sequentially connected in circuit with the resonant circuit to vary a detectable characteristic of the resonant circuit.

13. The position pointing device of claim 12 wherein the variable impedance comprises a variable reactance.

14. The position pointing device of claim 12 wherein the variable impedance comprises a variable reactance and a variable resistance.

15. The position pointing device of claim 12 wherein the variable impedance comprises a variable resistance.

16. The position pointing device of claim 12 wherein the variable impedance has a plurality of gamut of values, each gamut of values being associated with a different parameter.

17. The position pointing device of claim 16 wherein one of the parameters is pressure exerted by a tip of the device on a surface, the gamut of pressure values corresponding to different amounts of exerted pressure.

18. The position pointing device of claim 16 wherein some of the parameters are different colors associated with the device, the gamut values for each color corresponding to different hues of the color.

19. A position pointing device for use with a position detecting tablet for detecting an AC field having a predetermined frequency, the device comprising processing circuitry responsive to an external stimulus for emitting a plurality of sequential impulses, a resonant circuit having a resonant frequency approximately equal to the predetermined frequency, the resonant circuit being adapted to supply the AC field having the predetermined frequency to the tablet, a variable impedance connected in circuit with the resonant circuit so that when different values of the impedance are connected in circuit with the resonant circuit the resonant circuit has different characteristics which affect the AC field having the predetermined frequency and are detectable by the tablet, the sequential impulses causing different values of the impedance to be sequentially connected in circuit with the resonant circuit.

20. The position pointing device of claim 19 wherein the tablet emits an AC field having approximately the predetermined frequency, the emitted AC field having a first predetermined detectable characteristic followed by a second predetermined detectable characteristics, the second characteristic being derived a plurality of times in sequence after the first characteristic; the resonant circuit responding to the emitted AC field and being coupled with the processing circuitry so that in response to the resonant circuit responding to the emitted field having the first and second characteristics, the different values of the variable impedance are respectively sequentially connected in circuit with the resonant circuit to vary a characteristic of the resonant circuit detectable by the tablet in synchronism with the sequential impulses having the second characteristic.

21. The position pointing device of claim 20 wherein the variable impedance has a plurality of gamut of values, each gamut of values being associated with a different parameter.

22. The position pointing device of claim 12 wherein the characteristic is resonant frequency, the resonant frequency being varied by a relatively small amount so that it is detectable as a phase change by a synchronous detector of the tablet driven by a constant frequency.

23. The position pointing device of claim 19 wherein the characteristic is resonant frequency, the resonant frequency being varied by a relatively small amount so that it is detectable as a phase change by a synchronous detector of the tablet driven by a constant frequency.

24. The position pointing device of claim 20 wherein the characteristic is resonant frequency, the resonant frequency being varied by a relatively small amount so that it is detectable as a phase change by a synchronous detector of the tablet driven by a constant frequency.

25. In combination, a position pointing device for use with a position detecting tablet for detecting an AC field having a predetermined frequency, the device comprising processing circuitry responsive to an external stimulus for emitting a plurality of sequential impulses, a resonant circuit having a resonant frequency approximately equal to the predetermined frequency, the resonant circuit being adapted to supply the AC field having the predetermined frequency to the tablet, a variable impedance connected in circuit with the resonant circuit so that when different values of the impedance are connected in circuit with the resonant circuit the resonant circuit has different characteristics which affect the AC field having the predetermined frequency and are detectable by the tablet, the sequential impulses causing different values of the impedance to be sequentially connected in circuit with the resonant circuit, and a position detecting tablet including a transducer array for the AC field supplied by the resonant circuit, the tablet including circuitry responsive to the AC field transduced by the transducer array, the circuitry deriving an output signal having a value determined by the resonant circuit characteristic.

26. The combination of claim 25 wherein the tablet emits an AC field having approximately the predetermined frequency, the emitted AC field having a first predetermined detectable characteristic followed by a second predetermined detectable characteristic, the second characteristic being derived a plurality of times in sequence after the first characteristic; the resonant circuit responding to the emitted AC field and being coupled with the processing circuitry so that in response to the resonant circuit responding to the emitted field having the first and second characteristics, the different values of the variable impedance are respectively sequentially connected in circuit with the resonant circuit to vary a characteristic of the resonant circuit detectable by the tablet in synchronism with the sequential impulses having the second characteristic.

* * * * *